Figure 1:
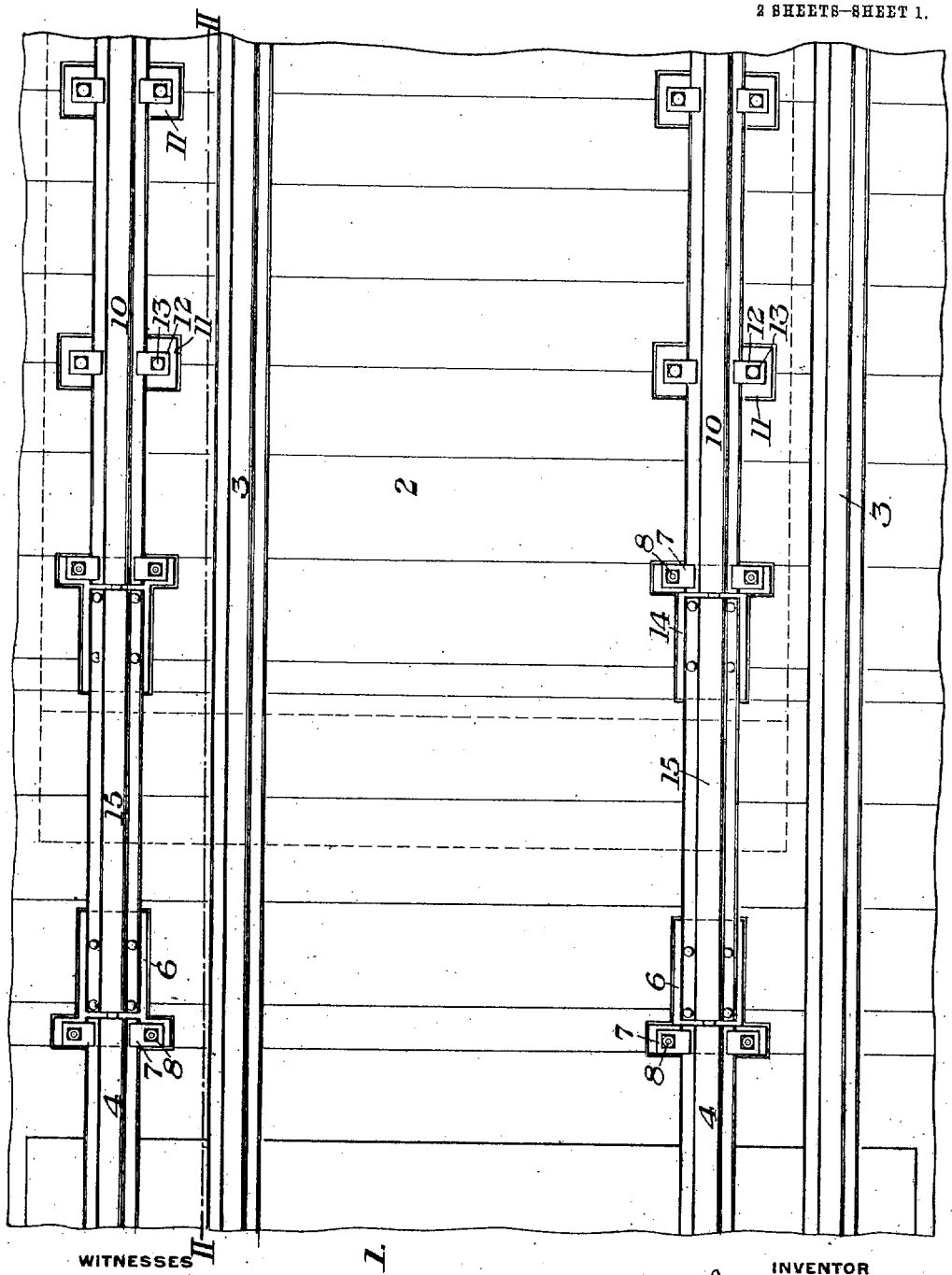

J. A. RISHEL.
APPROACH RAIL FOR TRACK SCALES.
APPLICATION FILED MAR. 27, 1909.

972,250.

Patented Oct. 11, 1910.
2 SHEETS—SHEET 1.

WITNESSES

INVENTOR
Jno. A. Rishel,
by Bakewell, Byrnes & Parmelee,
his Attys.

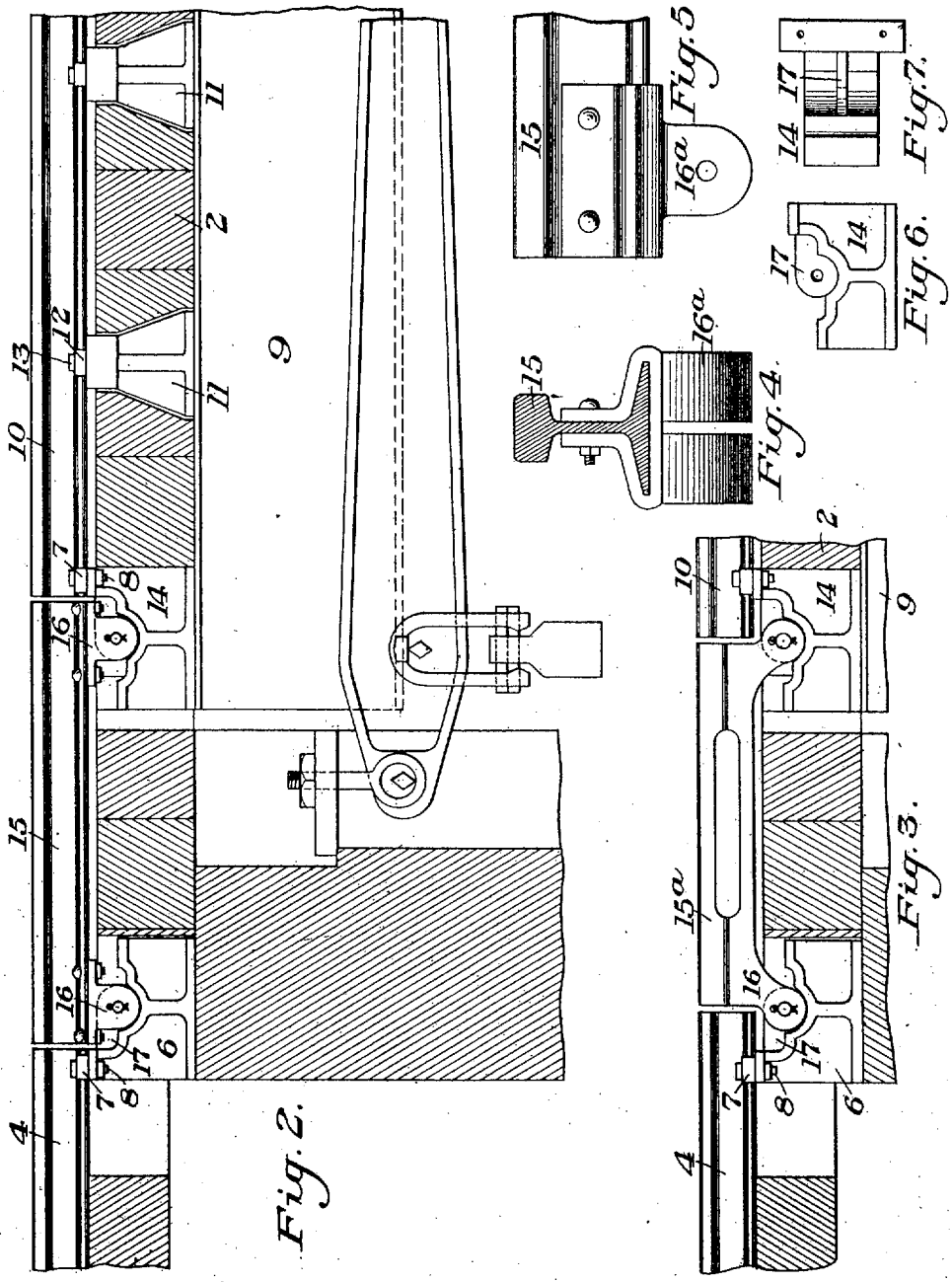

UNITED STATES PATENT OFFICE.

JOHN A. RISHEL, OF MUNHALL, PENNSYLVANIA, ASSIGNOR OF ONE-HALF TO JESSE R. OAKLEY, OF MUNHALL, PENNSYLVANIA.

APPROACH-RAIL FOR TRACK-SCALES.

972,250.  Specification of Letters Patent.  Patented Oct. 11, 1910.

Application filed March 27, 1909. Serial No. 486,256.

*To all whom it may concern:*

Be it known that I, JOHN A. RISHEL, of Munhall, Allegheny county, Pennsylvania, have invented a new and useful Approach-Rail for Track-Scales, of which the following is a full, clear, and exact description, reference being had to the accompanying drawings, forming part of this specification, in which—

Figure 1 is a plan showing one end of a track scale having approach rails constructed and arranged in accordance with my invention; Fig. 2 is a longitudinal sectional side elevation of the same on the line II—II of Fig. 1; Fig. 3 is a detail side elevation showing a modified construction for the approach rails; Figs. 4 and 5 are detail views showing another modified form of construction; Fig. 6 is a side elevation and Fig. 7 is a top plan showing, in detail, the construction of the pivot supports or chairs for the ends of the rails of the track scale.

My invention relates to track scales used for weighing cars and other railway rolling stock, and the object of the invention is to provide an improved approach rail for the scale track over which the cars pass from the rails of the scale to those of the track, and vice-versa, and improved means for supporting the ends of the approach rails by which jarring of and shocks to the scale mechanism, caused by the passage of the car wheels are reduced to a minimum.

In the drawings, 2 represents the platform or pit-covering of a track-scale, the timbers forming this platform extending entirely across the width of the pit for the weighing mechanism, and secured on the platform 2 which as shown is stationary are the dead rails 3 forming the dead rail track of the scale.

Extending into proximity to the ends of the scale platform 2 are the scale track rails 4, the ends of these rails being secured to the chairs 6 by means of the rail clips 7 and bolts 8. Located in the pit, beneath the platform 2 of the scale, are the beams 9, on which the scale rails 10 of the weighing mechanism are supported, these rails being carried on chairs 11 which extend through suitable openings in the stationary platform 2 covering the scale pit. The rails 10 are secured to the chairs 11 by means of the clip fastenings 12 and bolts 13. The ends of the rails 10 are carried on the ends of the chair 14 in a similar manner to that described for the chair 6, the chairs 14 being secured on and moving vertically with the beams 9 in weighing.

The beams 9 are carried in the usual manner, on the levers, forming the weighing mechanism which, not forming part of this invention, need not be further described. Instead of covering the scale pit with the stationary platform 2, as shown, the platform may be carried on the scale beams 9, in the usual manner.

As shown in Figs. 1, and 2, the approach rails 15, which connect the ends of the rails 4 with the ends of the scale track rails 10, are provided with a foot portion 16 on each end, which is mounted in the registering bearing portions on the chairs 6 and 14 so as to form a hinged joint or connection. The chairs 6 and 14 are provided with a central tongue portion 17, which extends upwardly within the groove or slot formed between the opposite ears of the feet 16 and registering holes in the feet 6 or 14 and the tongues 17 are provided through which a bolt or pin extends to hold the approach rails 15 in position on their chairs.

In the modification shown in Fig. 3 the foot portions on the ends of the approach rails 15$^a$ are formed integral with the rail, and the rail otherwise is made to operate in exactly the same manner as that shown in Figs. 1, 2, 4 and 5.

In the modifications shown in Figs. 4 and 5, the foot portion 16$^a$ is secured to the approach rail 15 by bolts extending through the web portion of the rail instead of being bolted, or otherwise secured to the flange portion of the rail as is shown in Fig. 1.

In the operation of my improved apparatus, the approach rails 15 are pivoted at their ends on the chairs 6 and 14 so as to permit the ends of the approach rails 15 adjoining the scale rails 10 to rise and fall with the scale during the weighing operations.

In the use of such scales, the scale rails generally become somewhat lower than the level of the track rails, and when this occurs each time the wheels of a car pass from one rail to the other there is a jar or shock on the weighing levers which causes damage to the weighing mechanism and soon makes the scale inaccurate.

By means of my improved construction the scale ends of the approach rails 15 are always on the same level as the adjoining ends of the track rails 10, while the opposite pivoted ends of the approach rails 15 remain at substantially the same elevation as the ends of the track rails 4 which they adjoin and to which they are attached.

The advantages of my invention will be apparent to those skilled in the art. The jarring of the weighing mechanism by reason of the passage of cars over the tracks is reduced to a minimum, and the life of such scales is very largely increased.

Modifications in the construction and arrangement of the parts may be made without departing from my invention.

I claim:—

1. A track scale comprising track, scale and approach rails, chairs forming supports for the ends of the track and scale rails, the ends of said approach rails having a hinged connection with the chairs; substantially as described.

2. A track scale comprising track, scale and approach rails, chairs forming rigid supports for the ends of the track and scale rails, the adjoining ends of said track rails and scale rails being connected by the approach rails, the ends of the approach rails being pivotally mounted on the chairs; substantially as described.

3. A track scale having a track, scale and connecting approach rail, chairs forming supports for the ends of said rails, the ends of the approach rail being pivotally mounted on the chairs; substantially as described.

4. A track scale having track and scale rails and an approach rail connecting the adjoining ends of the track rails and scale rails, chairs forming supports for the ends of the track and scale rails, the ends of said approach rails being pivotally supported on the chairs; substantially as described.

5. A track scale comprising track and scale rails and connecting approach rails, chairs forming supports for the ends of said track and scale rails, the ends of the approach rails being pivotally supported on said chairs, and means for holding the approach rails in position on the chairs; substantially as described.

6. In a track scale, an approach rail connecting the adjoining ends of the track rails with the scale rails, chairs forming supports for the ends of said rails one end of said approach rails being mounted on chairs supported on the scale platform; substantially as described.

7. A track scale, an approach rail connecting the adjoining ends of the track with the scale rails, chairs forming supports for the ends of the track and scale rails, the ends of the approach rails being hinged to said chairs and means for retaining the approach rails in position on the chairs; substantially as described.

8. In a track scale, a pivoted approach rail connecting the adjacent ends of the track rails and the scale rails and a chair forming a pivot support for the ends of said approach rails, one end of the approach rails being pivoted on said scale the adjoining ends of the track and scale rails being supported on said chairs; substantially as described.

In testimony whereof, I have hereunto set my hand.

JOHN A. RISHEL.

Witnesses:
   Geo. B. Bleming,
   R. D. Little.